May 19, 1959 L. E. WILLETT ET AL 2,886,960
EMERGENCY RELEASABLE LOCKING MEANS
Filed Sept. 23, 1954 7 Sheets-Sheet 1
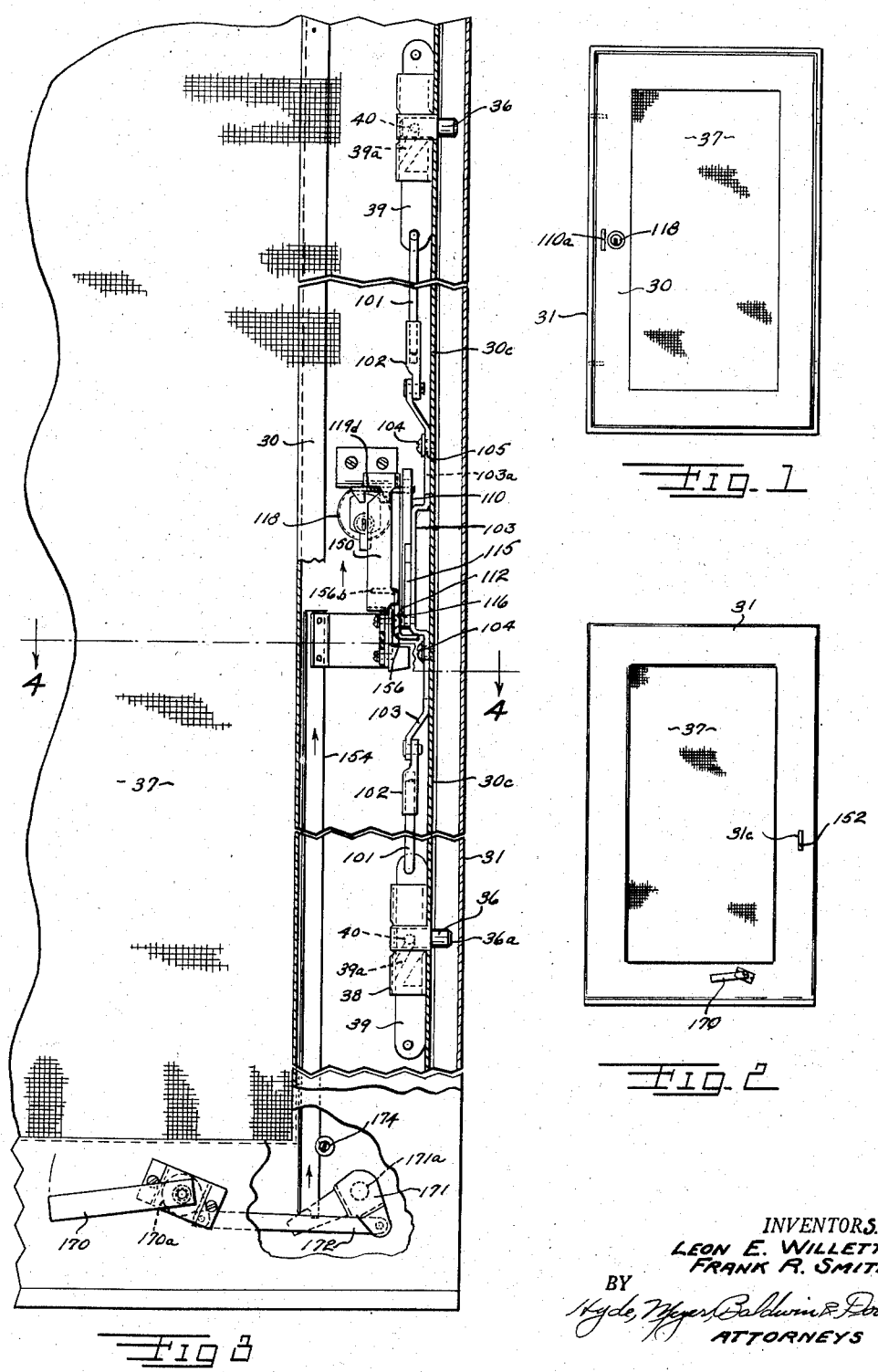
INVENTORS.
LEON E. WILLETT
FRANK R. SMITH
BY
ATTORNEYS May 19, 1959 L. E. WILLETT ET AL 2,886,960
EMERGENCY RELEASABLE LOCKING MEANS
Filed Sept. 23, 1954 7 Sheets-Sheet 2
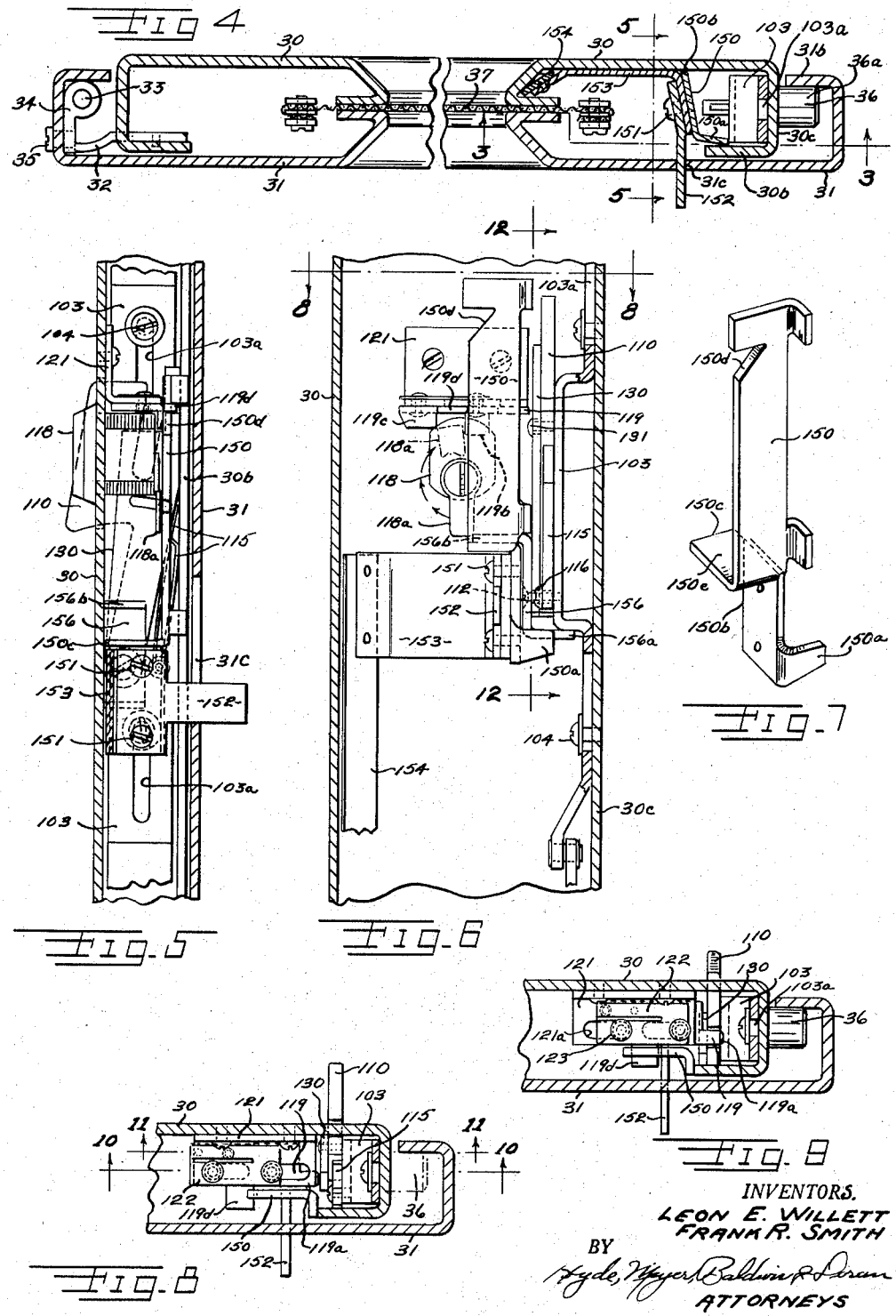
INVENTORS.
LEON E. WILLETT
FRANK R. SMITH
BY
ATTORNEYS

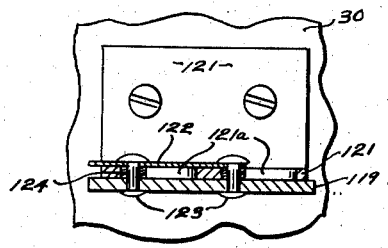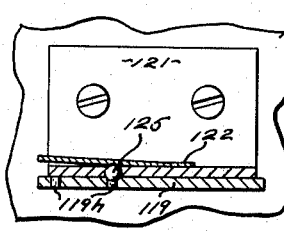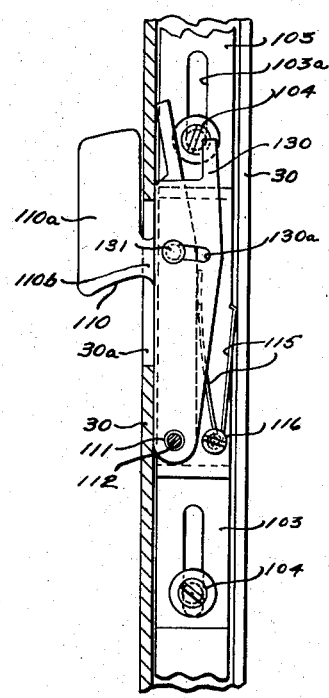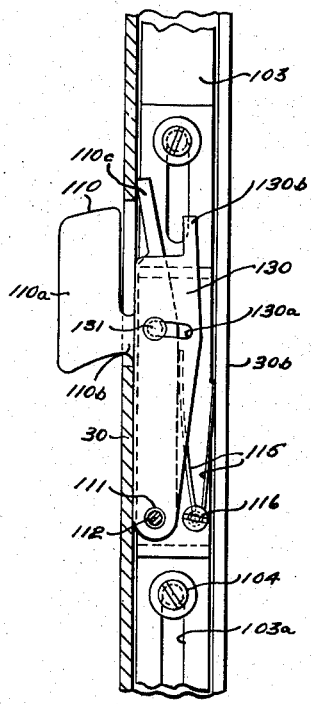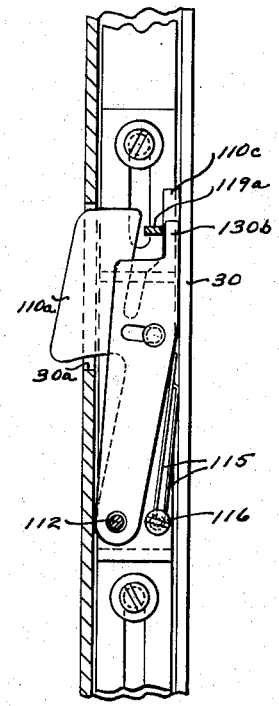

INVENTORS.
LEON E. WILLETT
FRANK R. SMITH
BY
ATTORNEYS

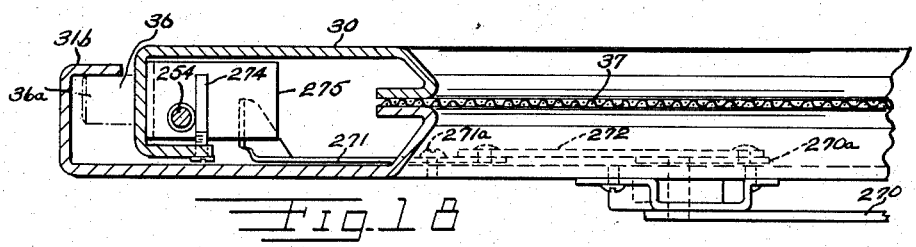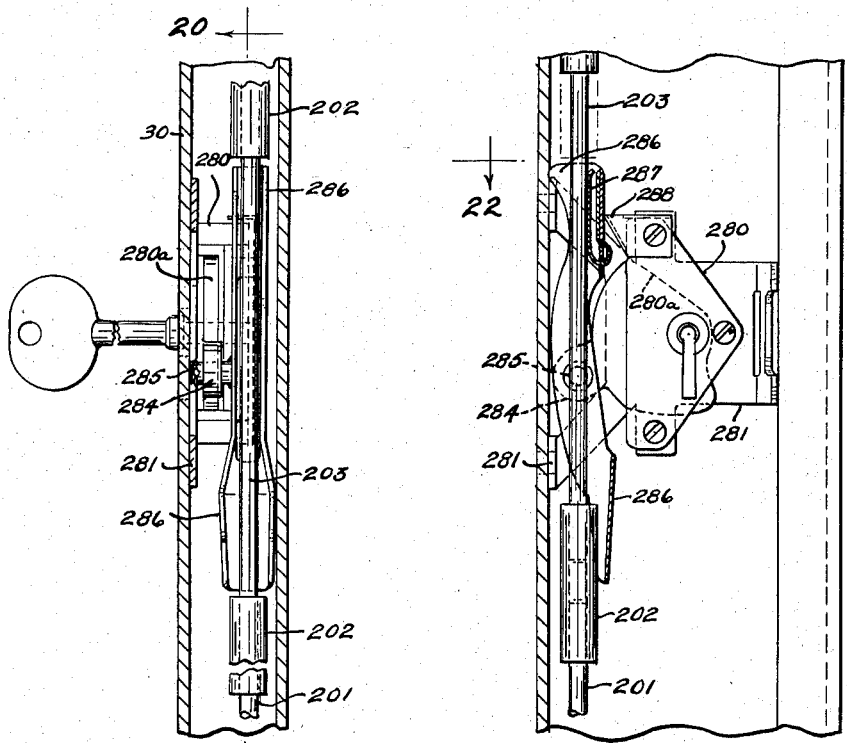

May 19, 1959 L. E. WILLETT ET AL 2,886,960
EMERGENCY RELEASABLE LOCKING MEANS
Filed Sept. 23, 1954 7 Sheets-Sheet 6

INVENTORS.
LEON E. WILLETT
FRANK R. SMITH
BY
ATTORNEYS

May 19, 1959 L. E. WILLETT ET AL 2,886,960
EMERGENCY RELEASABLE LOCKING MEANS
Filed Sept. 23, 1954 7 Sheets-Sheet 7
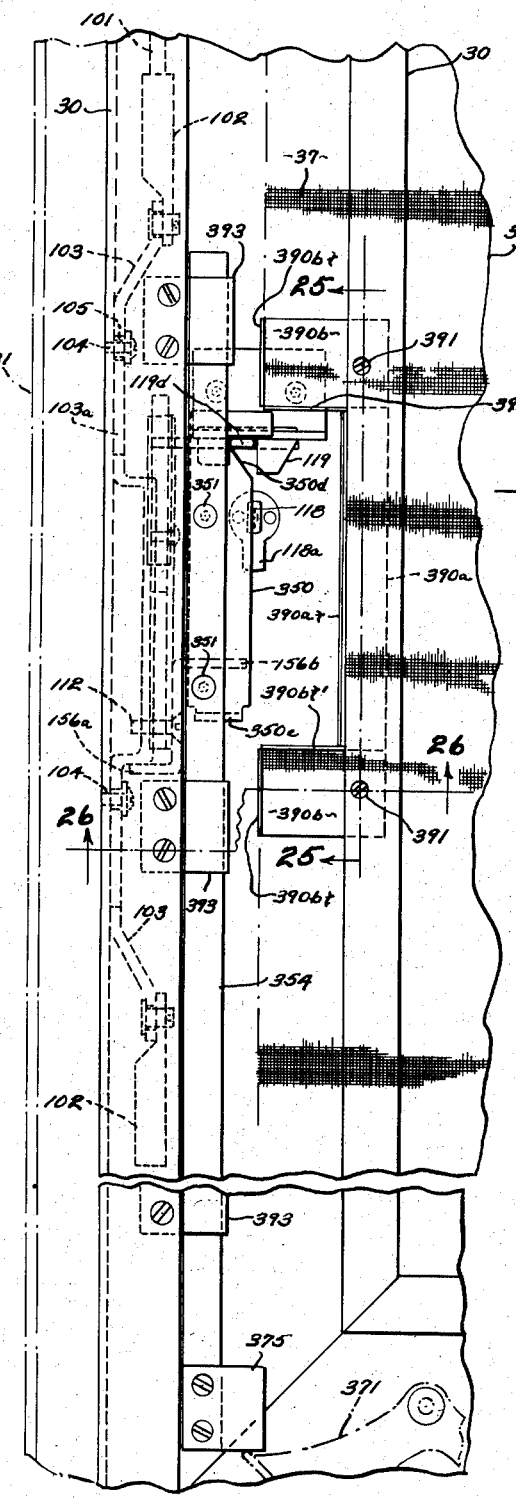
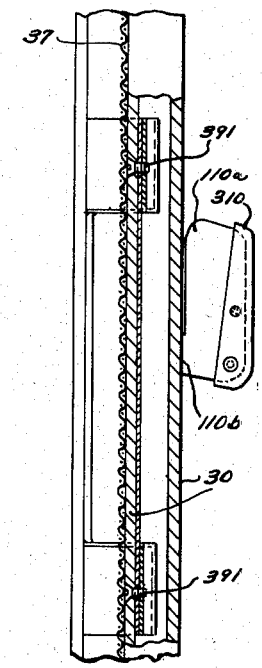
Fig. 24
Fig. 25
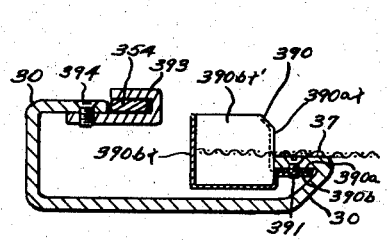
Fig. 26
INVENTORS.
LEON E. WILLETT
FRANK R. SMITH
BY
ATTORNEYS "United States Patent Office" 2,886,960
Patented May 19, 1959

2,886,960

EMERGENCY RELEASABLE LOCKING MEANS

Leon E. Willett and Frank R. Smith, Detroit, Mich., assignors to Chamberlin Company of America, Detroit, Mich., a corporation of Michigan Application September 23, 1954, Serial No. 457,806

24 Claims. (Cl. 70—92)

This invention relates to improvements in a detention screen and more particularly to the emergency release and locks therefor.

This application is a continuation-in-part of our copending application entitled "Emergency Release with Bit Key or Cylinder Locks," Serial No. 425,984, filed April 27, 1954, and now abandoned.

One of the objects of the present invention is to provide a detention screen that can be opened from the inside only by an attendant but may be opened during an emergency from the outside by firemen or others.

A further object of the present invention is to provide a detention screen, as set forth in the previous paragraph, that can be locked closed from the inside to prevent unauthorized opening without the proper key while the emergency release will open the screen from the outside without moving the lock.

A further object of the present invention is to provide a detention screen structure having a screen panel with a guard to prevent unauthorized opening of said detention screen structure by insertion of an instrument into said structure adjacent said screen panel.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is an elevational view taken from the inside of a building of a closed detention screen embodying the present invention with the parts in the lock bolt locked and blocked position;

Fig. 2 is an elevational view of the same screen taken from the outside of the building;

Fig. 3 is an enlarged elevational view, taken from the outside and partially in section of the right-hand portion of Fig. 2 taken along the line 3—3 of Fig. 4;

Fig. 4 is a horizontal sectional view taken along the line 4—4 of Fig. 3 across the full width of the detention screen;

Fig. 5 is a vertical sectional view taken along the line 5—5 of Fig. 4 with the parts in the lock bolt locked and blocked position;

Fig. 6 is an enlarged view of the lock operated blocking portion immediately above section lines 4—4 of Fig. 3 with both the blocking portion and lock bolts in unlocked position;

Fig. 7 is a perspective view of the emergency release cam removed from the Fig. 6 construction;

Fig. 8 is a horizontal sectional view taken along the line 8—8 of Fig. 6 with the key lock operated blocking latch of the lock bolt actuator in its retracted and unblocking position;

Fig. 9 is similar to Fig. 8 but has the blocking latch advanced to its blocking position with the lock bolts in locked position;

Fig. 10 is a vertical sectional view taken along the line 10—10 of Fig. 8 showing the slidable mounting for the reciprocating blocking latch;

Fig. 11 is a vertical sectional view taken along the line 11—11 of Fig. 8 through a ball and detent construction providing stops for the retracted and advanced positions of the blocking latch;

Fig. 12 is a vertical sectional view taken along the line 12—12 of Fig. 6 showing the manually operable portion, actuatable from the inside of the building, in the lock bolt unlocked position;

Fig. 13 is similar to Fig. 12 but shows the parts in the lock bolt locked position;

Fig. 14 is similar to Fig. 13 but shows the parts in the blocked and lock bolt locked position with the key operable lock actuated blocking latch keeping the parts blocked in the locked position against manual manipulation from inside of the building by anyone attempting to unlock the lock bolts;

Fig. 18 is a horizontal sectional view taken along the line 18—18 of Fig. 16;

Fig. 19 is a vertical sectional view taken along the line 19—19 of Fig. 17;

Fig. 20 is a vertical sectional view taken along the line 20—20 of Fig. 19 with the lock bolts in their unlocked position;

Figure 21:
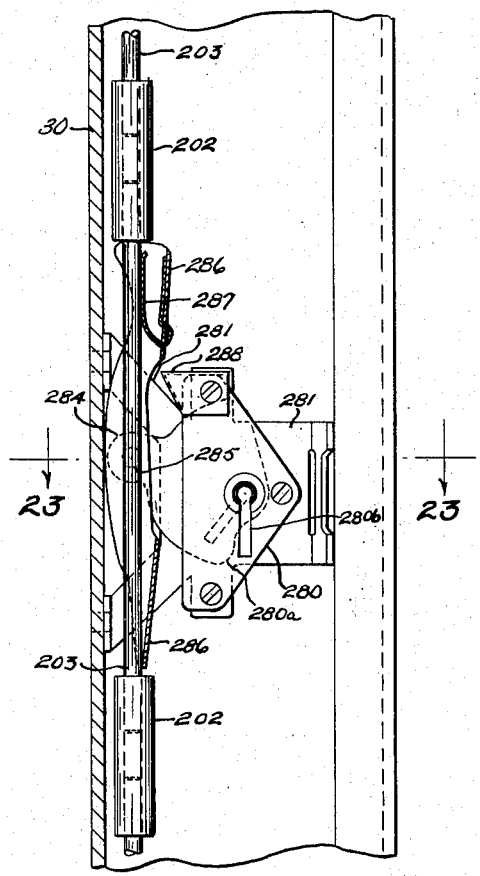
Fig. 21 is a sectional view, similar to Fig. 20, but with the lock bolts in their unlocked position by actuation of the key operated portion of the tumblers to their dotted line position.
Figure 22:
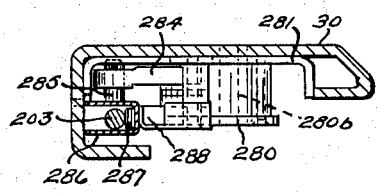
Figure 23:
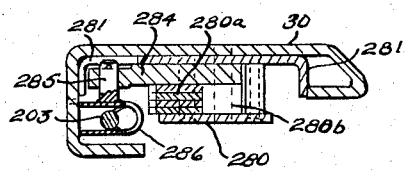

Figs. 22 and 23 are horizontal sectional views taken respectively along line 22—22 of Fig. 20 and line 23—23 of Fig. 21;

Fig. 24 is an elevational view of a swingable frame member having a third form of the invention and being a modification of the Fig. 3 construction;

Fig. 25 is a sectional view taken along lines 25—25 of Fig. 24 but with the parts in the lock bolt locked but unblocked position corresponding to Fig. 13; while Fig. 26 is a sectional view taken along lines 26—26 in Fig. 24.

While this invention might be adapted to various uses, it has been shown herein as applied to a detention screen of the type described in our U.S. Patent No. 2,633,192, issued March 31, 1953 entitled "Emergency Releasable Locking Mechanism for Detention Screens." Detention screens are used in hospitals, psychiatric institutions, and other places to restrain patients from escape, as well as in homes, apartment houses; and elsewhere to prevent injury either to the person or to the screen. In most institutions in which such detention screens are used, the patients should not be presumed to be capable of normal reasoning, or at least cannot be depended upon to always follow the safest or most logical course in an emergency. In case of fire, for example, their first thought might be to escape through the window covered by a detention screen, but detention screens normally are locked and the doors from the corridor to the rooms might be locked and inaccessible to attendants, etc., or even if the doors could be opened by an attendant or by remote control, the patient could not be expected to safely find a way to a predetermined fire escape. The problem then has been to so secure the detention screen that it can be opened only by an attendant from the inside, but in cases of emergency can be opened by firemen or by others from the outside. The preceding description in this paragraph applies with equal force to the present invention as well as the invention in our U.S. Patent No. 2,633,192, of which the present invention is an improvement.

In the aforementioned patent, a lock to prevent unauthorized unlocking of the lock bolts is key operated from the inside by the attendant. However, when the screen is unlocked from the outside, the key operated portion of this lock is also operated. In the present invention the emergency unlocking means, operable from the outside of the building, is effective to unlock the locking bolts without operating the key operated portion.

This construction has several advantages. First, the detention screen is unlocked more easily from the outside because fewer parts are moved. Second, the construction provides more safety for the patient. If one of the patients jams the key operated lock tumblers with wood, paper, or any other foreign substance, the detention screen can still be opened from the outside. Third, safety is again increased because the detention screen can be opened from the outside if the key operated lock is jammed at any time from the inside.

The basic structure of all forms of the detention screen disclosed herein is basically the same as that disclosed in our U.S. Patent No. 2,633,192 and reference to this patent may be had for further disclosure. In the first form of the invention in Figs. 1, 2, 3 and 4, in the second form in Figs. 15, 16, 17 and 18, and in the third form in Figs. 24, 25 and 26 this same basic structure is shown in more detail. The detention screen includes inner and outer frame members 30 and 31 with each extending around the four sides of an opening in the building wall where the screen is mounted. Frame member 31 is fixed to the building while frame member 30 is swingable with respect thereto by a hinge connection between the screen frame members. The open sides of the frame member channels face each other when the detention screen is closed, as best shown in Figs. 4 and 18.

The hinge connection between the frame members 30 and 31 is shown in Fig. 4. Two or more vertically aligned and spaced apart hinges are provided. Each hinge has attached to swingable frame member 30 a hinge arm 32 swingable about a vertical axis formed by hinge pin 33 carried on a complementary hinge arm 34 attached to the fixed frame member 31 by screws 35. When the detention screen is unlocked, the inner or swingable member 30 can be swung inwardly into the room away from the frame member 31 fixed in the building wall.

Swingable frame members 30 carry a detention screen panel 37 and its associated mounting parts. This construction has many common parts with and is basically the same as that shown in our U.S. Patent No. 2,633,192 to which reference can be had for further disclosure if necessary. It should be noted that the detention screen panel 37 is carried by the swingable frame member 30 and positioned between the two frame members when they are in closed relationship so that the edge mounting of the screen panel 37 is not accessible to the patients.

The frame members 30 and 31 may be locked in the closed position shown in Figs. 4, 18 and 25. A locking member means taking the form of two, vertically spaced, slidably mounted lock bolts 36, 36 in Figs. 3, 4, 17 and 18 are connected to and carried by the swingable frame member 30 for locking together the frame members in their closed position. These lock bolts are slidably mounted for movement outwardly through the periphery of the inner frame members 30 to a locked position wherein the outer tip 36a enters behind a retaining flange 31b of the outer frame member 31 in Figs. 4 and 18. Each lock bolt 36 is movable between locked and unlocked positions by vertical, sliding movement of a lock bolt master slide cam plate 39 within a lock bolt housing 38, generally U-shaped in cross section, fixed to a wall 30c of the inner frame member 30. Each lock bolt 36 is advanced and retracted by an inclined camming slot 39a on its associated cam plate 39 coacting with a pin 40 carried by the lock bolt. A linkage means for connecting the upper and lower lock bolts is provided in Figs. 3, 17 and 24 with this linkage means being slidable endwise and operatively effective on these lock bolts 36. As the linkage means moves downwardly, the lock bolts 36 associated therewith are advanced to their locked position shown in Figs. 4 and 18, and when the linkage means moves upwardly, the associated lock bolts are retracted to their unlocked position. All of the aforementioned and described construction is also found in our U.S. Patent No. 2,633,192 to which reference may be had for further disclosure if necessary.

All forms of the present invention have, generally speaking, a manually operable portion operable from the inside of the building for moving these lock bolts 36 by a linkage means between unlocked and locked positions, a key operated lock means to prevent unauthorized unlocking of said lock bolts from the inside by this manually operable portion without the proper key, and emergency release means manually operable from the outside of the building for unlocking said lock bolts without turning the key-operated portion of said lock means.

The first form of the invention is shown in Figs. 1 to 14 inclusive and will be described in detail first.

Linkage means for operating the lock bolts 36 is shown in Fig. 3 and comprises connecting rods 101, 101 with each connecting rod connected at opposite ends to its associated lock bolt cam plate 39 and to a coupling 102 with both couplings connected to the opposite ends of a lock slide 103. Pivotal connections are provided between each connecting rod 101 and cam plate 39 as well as between coupling 102 and the lock slide 103. There is a threaded connection between each connecting rod 101 and coupling 102 for adjustment purposes. Lock slide 103 is slidably connected on the inner face of wall 30c on frame members 30 by vertically spaced screws 104, 104. Each screw has a sleeve 105 telescoped thereover located in a vertically elongated slot 103a in the lock slide. It should now be apparent that this linkage means is endwise slidable and is operatively effective on the lock bolts 36 to move them between locked and unlocked positions in the manner previously described.

The detention screen can be locked and unlocked from the inside by vertically moving a manually operable portion or tab 110a in Fig. 1 of a lever 110. Lever 110 in Figs. 12 and 13 is pivotally connected around a sleeve 111 with said sleeve connected to the lock slide 103 by a screw 112 so that they move vertically together. A neck 110b on this lever extends through a vertical slit 30a in the frame member 30 with an enlarged tab 110a on the outside thereof for manual actuation of the lock bolts 36. This manually operable portion 110a is operable from the inside of the building, is operatively connected to the linkage means by the screw 112, and is slidable vertically for moving the lock bolt 36 between unlocked and locked positions.

Key operated lock 118 in Fig. 1 prevents unauthorized unlocking of the detention screen from the inside without the proper key. Figs. 6, 8 and 13 show the parts in their unblocked position so that the lock bolts can be unlocked or locked by manual manipulation of the tab 110a. Figs. 5, 9 and 14 show the position of the parts when the key-operated lock means has moved its blocking latch to its operative or blocking position to prevent unauthorized unlocking of the lock bolts by manipulation of tab 110a. In both the Fig. 13 and Fig. 14 positions the lock bolts are in their locked position.

The lever 110 must be manually swung from the Fig. 13 to the Fig. 14 position before the key operated lock means can move its blocking latch to its operative position. However, the Fig. 13 position is the normal position and movement to the Fig. 14 position requires pushing against the biasing force of a spring 115. This spring 115 in Fig. 13 is connected to the lock slide 103 by screw 116 intermediate its ends with the right-hand arm bearing against the inner side of the right-hand wall 30b in Fig. 13 and with the left-hand arm bearing against the right-hand side of lever 110 to normally bias it to the Fig. 13 position.

A key-operated cylinder lock 118 is shown in Figs. 3, 5 and 6 with said lock carried by the left-hand wall of the mounting frame 30 in Fig. 5 with the key insertable from the left-hand side thereof. Turning of the key in the lock will rotate an arm 118a in Fig. 6 so as to slide a blocking latch 119 from the Figs. 6, 8, 10 and 11 position to the Figs. 9 and 14 position. This latch has a projecting nose 119a in Figs. 9 and 14 that retains the lever 110 in the Fig. 14 position so that the tab 110a is blocked against upward movement by the upper end of slot 30a and the lock bolts 36 cannot be moved to the unlocked position from the inside of the detention screen.

The mounting of this latch 119 is shown in more detail in Figs. 10 and 11. A generally L-shaped supporting bracket 121 has a vertically extending leg connected to the frame members 30 and a horizontally extending leg with which the latch 119 is slidably associated. A spring cover plate 122 is secured to and carried by the latch 119 by spaced rivets 123 so that the horizontal leg of the mounting bracket 121 is sandwiched therebetween. Each rivet has a collar 124 telescoped thereover and slidable in one of two aligned, elongated slots 121a in the mounting bracket. Hence, the latch 119 can reciprocate horizontally back and forth along the length of slots 121a. A ball 125 in Fig. 11 is carried in a through hole in the horizontal arm of the mounting bracket 121 with the spring cover plate 122 biasing it toward alignment with either one of two locating holes 119h in latch 119 serving as positive locating stops at approximately opposite ends of the movement provided by the elongated slots 121a.

When this latch 119 is in its retracted position shown in Figs. 6, 8, 10, 11, 12 and 13, the lever 110 assumes its outwardly projecting position shown in Figs. 12 and 13 so that the projecting manually actuatable tab 110a thereon can be moved vertically to lock or unlock the lock bolts 36. After the tab 110a is depressed to the Fig. 14 position, the proper key may be inserted into the lock 118 and then turned so that arm 118a in Fig. 6 will engage against and push the depending lugs 119b on the latch 119 in Fig. 6 toward the right to move the projecting nose 119a into the Figs. 9 and 14 position to lock the screen by blocking manipulation of the tab 110a to prevent unlocking the lock bolts 36. When the Figs. 9 and 14 position is reached, arm 118a is rotated clockwise past the distal end of lug 119b to the solid line position of Fig. 6. Of course, the latch 119 may be moved back to its retracted position by turning the key in the opposite direction with the arm 118a in Fig. 6 bearing against the right-hand side of lug 119c integrally secured to the latch 119 to move it toward the left to its retracted position.

There is no danger of moving the blocking lever 119 forwardly to the Figs. 9 and 14 position by turning the key in lock 118 while the manipulating lever 110 is in the Fig. 12 or Fig. 13 position. A safety latch lever 130 is pivotally secured on sleeve 111 by screw 112 to the lock slide 103 in the same manner as the lever 110. A rivet 131 is carried by the lever 110 and travels in an arcuate slot 130a on the spring latch lever 130. Hence, when the spring 115 biases the lever 110 to the Fig. 13 position, the left edge of each lever generally bears against the inner side of the left wall of frame member 30 in Fig. 13 so that the upwardly projecting arm 130b on the safety latch lever 130 will prevent the forward movement of the projecting latch nose 119a into the Fig. 14 position.

When the actuating tab 110a is depressed to the Fig. 14 position, the connection provided by the slot 130a and rivet 131 causes the safety latch lever 130 to move to the Fig. 14 position with the upwardly projecting arm 130b out of alignment with the forward travel of the projecting latch nose 119a. Hence, when the latch nose 119a is projected into the Fig. 14 position, it engages the left side of both upwardly projecting arms 130b and 110c to hold both levers in the Fig. 14 position.

It should now be apparent that when the key-operated lock 118 is in its unlocked position with the blocking latch 119 retracted, tab 110a in Figs. 12, 13 and 14 is slidably movable between the lock bolt unlocked position in Fig. 12, the lock bolt locked position in Fig. 13 and a movement blocked position for lever 110 and a lock bolt locked position in Fig. 14. The key operated lock 118 in Figs. 5 and 6 acts as a blocking means with the latch 119 in the advanced position of Figs. 9 and 14 to block movement of the manually operable tab 110a from this locked and blocked position in Fig. 14. Operation of the key selectively moves the latch 119 between blocking and unblocking positions. This lock 118 prevents unauthorized unlocking from the inside of the lock bolts 36 by the manually operable tab 110a when in the blocked position in Fig. 14 unless the proper key is inserted into lock 118 and turned.

An emergency release means is provided so that the lock bolts 36 can be unlocked from the outside by a manually operable portion 152 or 170 in Fig. 2 without actuating the key operated portion of lock 118. An emergency release cam 150 is shown in Fig. 7 for performing this operation. Secured to the lower end thereof in Figs. 3, 4 and 6 by screws 151, 151 are an outwardly projecting lug or operating lever 152 and a laterally projecting plate 153. This lug 152 projects outwardly through the outside of the screen through a vertically elongated slot 31c (Figs. 2, 4 and 5) in the frame members 31 so as to serve as a manually operable portion for the emergency release means.

This emergency release cam 150 is guided for vertical movement within the channel of frame member 30. A projecting lug 150a (Figs. 4, 6 and 7) of the emergency release cam 150 guides against the inner surface of a channel wall 30b formed at the right end of the swingable frame member 30 in Fig. 4, edges 150b and 150c and plate 153 bear against the inner surface of the inside wall of the swingable frame member in Fig. 4, and a downwardly projecting, endwise movable push rod 154 in Figs. 4 and 6 nests in and travels vertically in the generally V-notch formed at one end of the channel shaped frame member 30 adjacent the detention screen panel 37 in Fig. 4.

When the parts are in the Fig. 9 and Fig. 14 position, the lock bolts 36 in Fig. 1 cannot be unlocked from the inside by manipulation of the tab 110a. However, moving vertically the emergency release lug or lever 152 in Figs. 2 and 4 sequentially first disengages the blocking latch projecting nose 119a by moving latch 119 to its retracted position in Figs. 6 and 8 and second unlocks the lock bolts 36 without actuating the key operated lock 118. This emergency release lug or lever 152 is exposed on the outside of the detention screen and moves vertically along the same path as the tab 110a manually operable from the inside for moving the lock bolts 36 from the locked to the unlocked position. First, camming surface 150d on the emergency release cam 150 urges the latch 119 to the left from the Fig. 9 to Fig. 8 position as surface 150d moves from the Fig. 3 to the Fig. 6 position by engaging and moving a laterally projecting lug 119d integrally carried by the latch 119. This action permits spring 115 to move the levers 110 and 130 from the Fig. 14 to the Fig. 13 position. Second, further upward movement of the emergency release cam 150 engages and moves upwardly the lock slide 103 as to retract the lock bolts 36 to their unlocked position. Here, the previously described screw 112 also secures to the lock slide 103 a lugged member 156 in Figs. 3 and 6 having a vertically extending central portion receiving screw 112, a lug 156a projecting horizontally to the right therefrom and engaging against the bent projection formed in the lock slide 103, and a top lug 156b projecting horizontally to the left therefrom. After the emergency release cam 150 has retracted the latch 119 and the levers have reached the Fig. 13 position, lug 150c on the emergency release cam 150 engages against the under surface of lug 156b so that further upward movement of the emergency release cam 150 will move the lock bolt actuating linkage means upwardly to unlock the lock bolts 36.

Instead of the emergency release lever 152, the pivotally mounted crank 170 in Figs. 2 and 3 may be used as the manually operable portion. The lever 152 and crank 170 are duplicates in these figures since both perform the same function, but it should be understood that either could be used to perform the emergency release operation. This crank 170 in Fig. 3 is pivotally connected to frame member 31 by a shaft projecting through the outer wall of the frame member 31 to the space between the frame members 30 and 31 with a crank arm 170a connected to said shaft for movement by the crank 170. A bell crank lever 171 is pivotally connected at 171a to the frame member 31, and a connecting rod 172 is pivotally connected at opposite ends to crank arm 170a and one arm of the bell crank lever 171. The other arm of the bell crank lever 171 bears against the bottom of the push rod 154 with the latter suitably guided to travel in and be carried by frame member 30 by a guide collar 174. When the frame members 30 and 31 are in their closed position, the bottom end of the push rod 154 aligns with the bell crank 171 so that clockwise rotation of the crank 170 on the outside of the detention screen in Fig. 3 will move the push rod 154 upwardly in the direction of the arrow for unlocking the lock bolts 36. The detachable linkage connection between the push rod 154 and the bell crank 171 permits the frame members to open and close. Also, this detachable connection permits crank 170 on the outside of the detention screen only to unlock the lock bolts 36 but not to lock them. The locking action must take place from inside the building.

Hence, it should now be apparent that the emergency release means operatively engages the lock bolt actuating linkage means and has a manually operable portion, either lever 152 or crank 170, carried by frame member 31 and operable from the outside of the detention screen for unlocking lock bolts 36 without actuating the key operated tumblers of lock 118. This release means includes a lock by-pass means, including the emergency release cam 150, for rendering the lock 118 ineffective to hold the lock bolts 36 in locked position so that in an emergency a fireman, etc. can unlock from the outside the lock bolts 36 without actuating the key operated tumbler portion of the lock 118. This emergency release means includes a disengaging means for uncoupling the key operated lock 118 and the lock bolt actuating linkage means during operation of the emergency release lever 152 or crank 170 from the locking to the unlocking position.

The second form of the invention is shown in Figs. 15 to 23 inclusive and more closely resembles the structure disclosed in our U.S. Patent No. 2,633,192.

Figure 17:
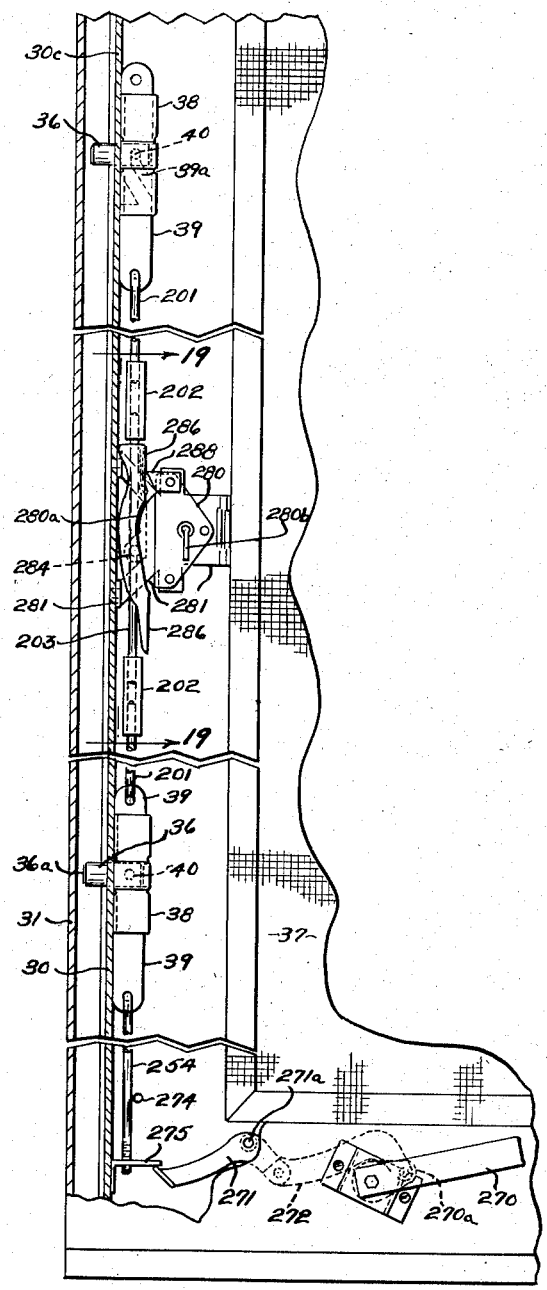
Fig. 17 is an outside elevational view, enlarged and partially in section of the left-hand portion in Fig. 16.
Figure 15:
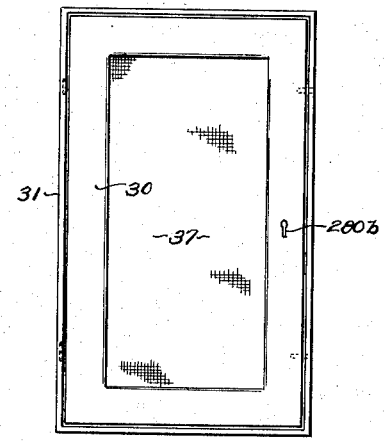
Fig. 15 is an elevational view taken from the inside of a building of a detention screen, similar to Fig. 1, but embodying the second form of the present invention.
Figure 16:
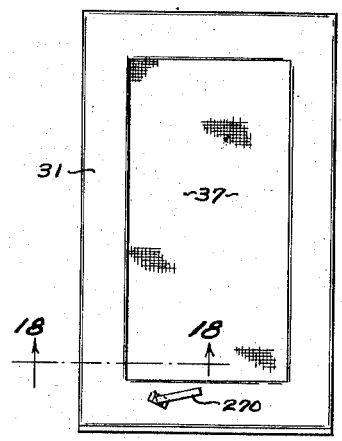
Fig. 16 is an elevational view of the detention screen in Fig. 15 taken from outside the building.

Fig. 17 discloses an endwise slidable linkage means operatively connected to the lock bolts 36, 36 to move them between locked and unlocked positions. This linkage means includes a connecting rod 201 pivotally connected to each lock bolt master slide cam plate 39 by a pivotal connection, and a connecting release rod 203 connected at opposite ends by couplings 202 to the connecting rod 201 by threaded connections. When this linkage means moves endwise in the upwardly direction, the lock bolts 36 are retracted to their unlocked positions, and when it moves downwardly, the lock bolts 36 are advanced to their locked position.

This detention screen also includes a manually operable portion carried by the swingable frame member 30 and manually operable from the inside of the building for moving the lock bolts 36, 36 between unlocked and locked positions by operatively actuating the linkage means connecting these lock bolts. A bit key operated lock 280 is provided in Figs. 15 and 17 and is secured to the frame member 30 by a mounting plate 281 in the manner best shown in Figs. 21 and 23. The lock 280 has rotatable tumblers 280a therein adapted to coact with the proper key when inserted into the lock key hole 280b. These tumblers 280a, the key operated portion of the lock, are connected to a tumbler actuated arm 284 which arm in turn manipulates the linkage means and lock bolts. The structure described up to this point is basically the same as in U.S. Patent No. 2,633,192 except for the type of keyhole and lock tumblers since the lock 280 uses a bit key instead of the hexagonal key in said patent.

In said patent, the tumbler actuated arm is directly connected to the linkage means while in the present disclosure, the arm 284 is pivotally connected on a toggle pin 285 (Fig. 23) fixed to a shuttle 286 for actuating said linkage means. Fig. 17 discloses the shuttle 286 at the lower limit of its travel while Fig. 21 discloses its position at the upper limit of its travel. This shuttle 286 is generally U-shaped in horizontal cross section to be wrapped around two sides of the release rod 203, as better shown in Fig. 23, to permit endwise reciprocation of rod 203. The top of the shuttle 286 remains in driving position relative to the lower edge of the upper coupling 202 at all times, as shown for example in both the Fig. 17 and Fig. 21 positions. Hence, clockwise movement of the tumbler actuated arm 284 will move the linkage means upwardly from the Fig. 17 to the Fig. 21 position so as to unlock the lock bolts 36.

When the lock bolts 36 are being locked, the operation of shuttle 286 is especially important. A spring 287 in Fig. 21, interlocked with said shuttle by insertion in two parallel slits in the shuttle, biases the shuttle 286 to the Fig. 21 position by bearing against the release rod 203. Hence, when the shuttle 286 is at the upper limit of its travel in Fig. 21, its lower end is adapted to abut against the top of the lower coupling 202 to move downwardly the linkage means so as to move the lock bolts 36 to the locked position. As the parts approach the Fig. 17 position, a camming member 288, secured to lock 280, urges the shuttle against the force of spring 287 to pivot about the toggle pin 285 toward the Fig. 17 position so as to gradually withdraw the lower end of the shuttle 286 from driving contact with the top of the lower coupling 202.

It should now be apparent that the proper key, when inserted into the keyhole 280b and turned from the Fig. 17 to the Fig. 21 position, can be used to move the lock bolts 236 from the locked to the unlocked position. This key serves as the manually operable portion and is manually operable from the inside of the building to give the attendant control over the locking of the screen. The shuttle 286 serves as a coupling between the manually operable key and the rod 203 of the linkage means for moving lock bolts 36 between locked and unlocked positions. This shuttle type link 286 is pivotally connected intermediate its ends to the manually operable tumblers 280a and the key for drivingly connecting the linkage means for alternately locking and unlocking the screen.

In this second form of the invention, it should be noted that the aforementioned structure serves also as the lock means to prevent unauthorized unlocking of the lock bolts 36 unless the proper key is used. Hence, these parts serve a dual function in this construction.

Manually operable emergency release means is provided for unlocking the lock bolts 36 by manual manipulation from the outside of the detention screen. This takes the form of a pivotally mounted crank 270 serving as a manually operable portion on the outside of the building on the outer surface of the frame member 31 in Figs. 16 and 17 to unlock the lock bolts 36. The crank 270 has a shaft extending through this frame member 31 with a radially extending arm 270a located between the frame members 30 and 31. A bell crank 271 is pivotally mounted by pivot 271a to the frame member 31 with a connecting rod 272 pivotally connected at opposite ends to arm 270a and to one arm of the bell crank 271. The other arm of the bell crank 271 is adapted to abut against the bottom of an angle 275 in Fig. 17 connected to a vertically extending push rod 254 pivotally connected at its upper end to the bottom of the lower lock bolt cam plate 39. A guide pin 274 on the frame member 30 guides the push rod 254, carried by frame member 30, for vertical movement on said frame member 30. Of course, when the frame members are swung to their open position, the frame member 30 carries the angle 275 and all parts thereabove out of operating alignment with the bell crank 271. When the frame members are again in their closed position, the bell crank 271 aligns with the angle 275 so that counterclockwise rotation of crank 270 in Fig. 17 will lift the angle 275 and retract the lock bolts 36 to their unlocked position. The shuttle 286 is in the Fig. 17 position when the lock bolts 36 are locked. Upon actuation of the crank 270, the lower coupling 202 can slip past the lower driving edge of the shuttle 286 so that the linkage means moves from the Fig. 17 to the Fig. 20 position to move the lock bolts 36 from the locked to the unlocked position without moving arm 284. The shuttle type coupling 286 is drivingly disconnected from the lower coupling member 202 of the linkage means in the Figs. 17 and 20 positions so that actuation of the emergency release crank 270 in Fig. 17 will unlock the lock bolts without rotating the manually operable key actuated tumblers 280a.

Hence, it should now be apparent that the emergency release means operatively engages the lock bolt actuating linkage means and has a manually operable crank 270 carried by frame member 31 and operable from the outside of the detention screen for unlocking lock bolts 36 without actuating the key operated tumblers 280a. This release means includes a lock by-pass means, including shuttle 286, for rendering the lock 280 ineffective to hold the lock bolts 36 in locked position so that in an emergency a fireman, etc. can unlock from the outside the lock bolts 36 without actuating the key operated tumblers 280a of the lock 280. This emergency release means includes a disengaging means, including shuttle 286, for uncoupling the key operated lock tumblers 280a and the lock bolt actuating linkage means during operation of the emergency release crank 270 from the locking to the unlocking position.

In the third form of the invention in Figs. 24, 25 and 26, the lock bolt operating linkage means including lock slide 103, the manually operable tab 110a, the key operated lock 118, and the blocking latch 119 are all identical with and operate in the same manner as in the first form of the invention in Figs. 1 to 14 inclusive. However, a tab cover 310 has been telescoped over, covers the outer end of, and is secured by rivets to tab 110a in Fig. 25. This cover 310 serves as a conveniently grasped actuating portion, protects the user against harm by the thin outer edge on tab 110a, and may serve as a stop when it abuts against the outer surface of frame member 30 when lever 110 is moved inwardly to the Fig. 14 position.

The emergency release means in Figs. 24-26 is structurally different from that in Figs. 1-14 but operates in basically the same manner. A confined patient, having sufficient ingenuity, might escape by inserting a nail file or other thin, sharp tool toward the right in Fig. 4 between the top surface at the right hand edge of screen panel 37 and frame member 30 until able to reach and raise emergency release cam 150 or lugged member 156 to unlock lock bolts 36 by actuating the emergency release means in basically the same manner as in Figs. 1-14.

In Figs. 24-26, a guard 390 is provided to protect against insertion from the right in Fig. 26 of such an instrument between the lower surface of detention screen panel 37 and the upper right hand surface of frame member 30 so as to cause unauthorized unlocking of lock bolts 36. Guard 390 is formed of three sections, a central section 390a and two end sections 390b that are mirror images of each other, with adjacent sections secured together and to the inside of the channel shape of frame member 30 by screws 391. Upstanding flanges 390af and 390bf, 390bf' on these respective sections extend across in Fig. 26 the plane of the gap between screen panel 37 and member 30 so as to prevent insertion of a lock bolt actuating instrument.

To avoid interference with guard 390, push rod 354 (comparable to rod 154 in Figs. 4 and 6) has been relocated in Fig. 26 at the opposite end of channel shaped frame member 30 wherein its is generally coplanar with the end of this channel shape and mounted thereon for endwise movement by a plurality of vertically spaced apart slide brackets 393 each secured to frame 30 by screws 394 and encircling rod 354 on three sides.

The new location of rod 354 permits simplification in other structure. Emergency release cam 350 (comparable to cam 150 in Fig. 7) is of simpler construction and now requires only notch type camming surface 350d coacting with latch lug 119d and lug 350e coacting with lug 156b in the same manner as previously described with respect to Fig. 6. Connecting plate 153 is eliminated since fastening elements 351 secure rod 354 to cam 350.

Guard 390 prevents unlocking lock bolts 36 by a thin instrument such as a nail file being inserted between the screen panel and frame member. Guard 390 adequately protects from actuation by said instrument any of the lateral projections—notch 350d or lug 156a, 156b or 350e—on the endwise and vertically movable element for disengaging the blocking latch 119 and unlocking lock bolts 36.

The lock bolts are locked and unlocked by the Fig. 24 construction in basically the same manner as in the Fig. 3 construction. Although any suitable type manually operable release means may be provided for unlocking the lock bolts by the Fig. 24 construction, a crank and bell crank 371, similar to cranks 270, 271 in Fig. 17, is disclosed by dot-dash lines as being mounted on frame member 31 and coacting with a block 375 secured to rod 354. The emergency release manually operable lug 152 in Figs. 2 and 5 has been omitted.

In the usual construction wherein detention screens of the nature described herein are required, the patient's safety makes it a practical necessity that the glass window be disposed outside the screen. An attendant usually opens the screen from the inside, as already described, and opens or shuts the glass window in accordance with desired ventilation conditions. Mechanical opening or closing devices may, however, be provided which can be operated by a control from the inside to open the glass window without opening the screen. In any event, the glass window need not be locked as long as the detention screen is locked. In emergencies, such as fire or the like, any one on the outside may open the glass window, even if it is necessary to break the pane (if the window happens to be locked), and may then open the detention screen as already described by the emergency release means by manually actuating the emergency release lever 270.

The present invention has an important advantage over the construction shown in our U.S. Patent No. 2,633,192. In said patent, the key operated portion of the lock is actuated or turned when the emergency release lever is operated from the outside for unlocking the detention screen lock bolts of the detention screen locking means. In all forms of the present invention, operation of the emergency release means by the lever on the outside does not actuate the key operated portion of lock 118 or 280, This provides several advantages. First, it is easier to unlock the detention screen in an emergency because fewer parts must be moved when operating the emergency release manually operable lever or crank 152, 170, 270 or 371. Second, the construction is safer. If the patient jams the lock tumblers with wood, paper, etc., or if the lock jams by freezing or mechanical failure, the detention screen can still be opened from the outside because the key operated tumblers in locks 118 and 280 do not have to be operated.

Various changes in details and arrangement of parts can be made by one skilled in the art without departing from either the spirit of this invention or the scope of the appended claims.

What we claim is:

1. In a detention structure having a detention panel movable between open and closed positions, locking member means for locking said panel in said closed position, means manually operable from one side of said panel to move said locking member means from a normal unlocked position to locking position with said unlocked position permitting movement of said panel into and out of closed position without manual operation of said manually operable means, locked means operable from said one side to prevent unlocking said locking member means from locked position from said one side without the proper key with said lock means including a key operated portion, release means operable from the other side of said panel for unlocking said locking member means without operating said key operated portion and means operatively connecting together said panel, said locking member means and said lock means.

2. In a detention structure having a detention panel movable between open and closed positions, locking member means for locking said panel in said closed position, means manually operable from one side of said panel to move said locking member means from a normal unlocked position to locking position with said unlocked position permitting movement of said panel into and out of closed position without manual operation of said manually operable means, lock means operable from said one side to prevent unlocking said locking member means from locked position from said one side without the proper key with said lock means including a key operated portion, release means operable from the other side of said panel for rendering said lock means ineffective to hold said locking member means in locked position so as to unlock said locking member means and means operatively connecting together said panel, said locking member means and said lock means.

3. In a detention structure having a detention panel movable between open and closed positions, locking member means for locking said panel, linkage means operatively effective on the locking member means to move it to locked position, means manually operable from one side of said panel and operatively connected to said linkage means for moving said locking member means to locking position, lock means operable from said one side to prevent unauthorized unlocking said locking member means from locked position from said one side, release means operatively engaging said linkage means and manually operable from the other side of said panel with said release means including lock by-pass means for rendering said lock means ineffective to hold said locking member means in locked position, and means operatively connecting together said panel, said locking member means and said lock means.

4. In a detention structure having a detention panel movable between open and closed positions, locking member means for locking said panel, means manually operable from one side of said panel to move said locking member means to locking position, lock means operable from said one side to prevent unauthorized unlocking said locking member means from locked position from said one side, release means manually operable from the other side of said panel for rendering said lock means ineffective to hold said locking member means in locked position, said last recited means including disengaging means for uncoupling said lock means and said locking member means during operation of said release means from the locking to unlocking position, and means operatively connecting together said panel, said locking member means and said lock means.

5. In a detention structure having a detention panel movable between open and closed position, locking member means for locking said panel, linkage means operatively effective on the locking member means to move it between locked and unlocked positions, means manually operable from one side of said panel and operatively connected to said linkage means for moving said locking member means to locking position, lock means operable from said one side to prevent unlocking said locking member means from locked position from said one side without the proper key with said lock means including a key operated portion effective upon said linkage means, emergency release means operatively engaging said linkage means and manually operable from the other side of said panel for rendering said lock means ineffective to hold said locking member means in locked position and for unlocking said locking member means without operating said key operated portion, said release means including disengaging means for uncoupling said key operated portion and said linkage means during operation of said emergency release means from the locking to unlocking position, and means operatively connecting together said panel, said locking member means and said lock means.

6. In a detention structure having a detention panel movable between open and closed positions, locking member means, said locking member means comprising bolts slidably mounted for locking said panel, means manually operable from one side of said panel to move said lock bolts between unlocking and locking positions, lock means operable from said one side to prevent unlocking said bolts from locked position by said manually operable means from said one side without the proper key with said lock means including a key operated portion, release means operable from the other side of said panel for unlocking said lock bolts without operating said key operated portion, and means operatively connecting together said panel, said locking member means and said lock means.

7. In a detention structure having a detention panel movable between open and closed position, locking member means, said locking member means comprising bolts slidably mounted for locking said panel, endwise slidable linkage means operatively effective on the lock bolts to move them between locked and unlocked positions, means having a manually operable portion operable from one side of said panel and operatively connected to said linkage means for moving said lock bolts between unlocking and locking positions, lock means operable from said one side to prevent unlocking said lock bolts from locked position from said one side without the proper key with said lock means including a key operated portion effective upon said linkage means, emergency release means operatively engaging said linkage means and having a manually operable portion operable from the other side of said panel for rendering said lock means ineffective to hold said lock bolts in locked position and for unlocking said lock bolts without operating said key operated portion, said release means including disengaging means for uncoupling said key operated portion and said linkage means during operation of said emergency release means from the locking to unlocking positions, and means operatively connecting together said panel, said locking member means and said lock means.

8. In a detention structure having a detention panel movable between open and closed position, locking member means for locking said panel, means manually operable from one side of said panel and movable between unlocking and locking positions for moving said locking member means between unlocking and locking positions, key operable blocking means selectively effective to block movement of said manually operable means from said locked position, and means having a second manually operable portion operable from the other side for disengaging said blocking means and unlocking said locking member means.

9. In a detention structure, as set forth in claim 8, wherein said second manually operatable portion takes the form of an exposed lever operable from said other side and movable along the same path as said first manually operable portion on said one side.

10. In a detention structure, as set forth in claim 8, wherein said second manually operatable portion takes the form of a pivotally mounted crank operable from said other side.

11. In a detention structure having a detention panel movable between open and closed position, locking member means for locking said panel, means manually operable from one side of said panel for moving said locking member means between unlocking and locking positions, said last recited means having a first manually operable portion slidably movable between unlocked and locked positions and movable into a blocked and locked position, key operable blocking means selectively effective to block movement of said manually operable means from said blocked position, and means having a second manually operable portion operable from the other side for disengaging said blocking means and unlocking said locking member means.

12. In a detention structure having a detention panel movable between open and closed position, locking member means for locking said panel, linkage means operatively effective on the locking member means to move it to locked position, means manually operable from one side of said panel and operatively connected to said linkage means for moving said locking member means between unlocking and locking positions, said last recited means having a first manually operable portion being slidably movable between unlocked and locked positions and movable into a blocked and locked position, key operable blocking means selectively effective to block movement of said manually operable means from said blocked position, and means having a second manually operable portion operable from the other side for sequentially disengaging said blocking means and unlocking said locking member means by actuating said linkage means.

13. In a detention structure having a detention panel movable between open and closed position, locking member means for locking said panel, means manually operable from one side of said panel for moving said locking member means between unlocking and locking positions, blocking means with a key operable lock selectively effective to block movement of said manually operable means from said locked position, and means having a second manually operable portion operable from the other side for disengaging said blocking means and unlocking said locking member means without actuating said key operated lock.

14. In a detention structure having a detention panel movable between open and closed positions, locking member means for locking said panel in said closed position, means including a first manually operable portion operable from one side of said panel for moving said locking member means to locking position, and means including a second manually operable portion operable from the other side of said panel for moving said locking member means from locking to unlocking position without actuating said first manually operable portion.

15. In a detention structure having a detention panel movable between open and closed positions, locking member means for locking said panel in said closed position, means including a first manually operable portion operable from one side of said panel for moving said locking member means between locking and unlocking positions, and means including a second manually operable portion operable from the other side of said panel for moving said locking member means from locking to unlocking position without actuating said first manually operable portion.

16. In a detention structure, as set forth in claim 12, a frame member associated with said structure, said frame member being channel shaped with a V-notch at one end in section, said last mentioned means including an endwise movable rod nested in said V-notch.

17. In a detention structure, as set forth in claim 12, a frame member associated with said structure, said frame member being channel shaped in section, said last mentioned means including an endwise movable rod generally coplanar with one end of said channel shape and mounted thereon by at least partially encircling rod slide brackets.

18. In a detention structure, as set forth in claim 12, a frame member associated with said structure, a guard extending across space between said member and said detention panel when said panel is in closed and locked position so as to protect against insertion of an instrument therebetween to cause unauthorized actuation of said means for disengaging said blocking means and unlocking said locking member means.

19. In a detention structure having a frame member operatively associated with a movable detention panel, locking member means for locking and unlocking said panel, means manually operable from one side of said panel for causing locking movement of said locking means, and a guard extending across space between said member and said detention panel in said locked position so as to protect against insertion of an instrument therebetween to cause unauthorized actuation of said locking means.

20. In a detention structure having a frame member operatively associated with a movable detention panel, locking member means for locking and unlocking said panel, said locking means including an element endwise movable between locking and unlocking position and having a lateral projection thereon, means manually operable from one side of said panel for causing movement of said element, and a guard associated with said member and said panel and extending across space in said locked position between said member and said detention panel at said lateral projection so as to protect against insertion of an instrument therebetween to cause unauthorized actuation of said locking means by engaging said lateral projection.

21. In a detention structure having a frame member operatively associated with a movable detention panel, locking member means for locking and unlocking said panel, said locking means including an element endwise movable between locking and unlocking positions and having a lateral projection thereon, means manually operable from one side of said panel for causing locking means actuating movement of said element, emergency release means operable from the other side of said panel for causing unlocking movement of said element, and a guard associated with said member and said panel and extending across space between said panel and the member on said one side of said panel at said lateral projection so as to protect against insertion of an instrument therebetween to cause unauthorized actuation of said locking means by engaging said lateral projection.

22. A structure, as set forth in claim 1, with said detention structure adapted to close an opening in an enclosed zone, said one side being inside said zone and said other side being outside said zone.

23. A combination, as set forth in claim 3, with said manually operable means having a first manually operable portion and a coupling between said first operable portion and linkage means for moving said locking member means to locking position, said release means having a second manually operable portion operable from the other side for moving said linkage means from locked to unlocked positions, said coupling in said locking position drivingly disconnecting from said linkage means so that actuation of said second manually operable portion will unlock said panel without moving said first manually operable portion.

24. A combination, as set forth in claim 3, with said manually operable means having a first manually operable portion and a coupling between said first operable portion and linkage means for moving said locking member means between locking and unlocking positions, said release means having a second manually operable portion operable from the other side for moving said linkage means from locked to unlocked positions, said coupling in said locking position drivingly disconnecting from said linkage means so that actuation of said second manually operable portion will unlock said panel without moving said first manually operable portion, said coupling taking the form of a link pivotally connected intermediate its ends to said first manually operable portion and drivingly connecting said linkage means for alternatively locking or unlocking said panel.

References Cited in the file of this patent

UNITED STATES PATENTS

| | | |
|---|---|---|
| 1,815,584 | Prinzler | July 21, 1931 |
| 2,212,316 | Edwards | Aug. 20, 1940 |
| 2,417,711 | Smith et al. | Mar. 18, 1947 |
| 2,436,277 | Willett | Feb. 17, 1948 |
| 2,633,192 | Willett et al. | Mar. 31, 1953 |
| 2,645,924 | Kelly | July 21, 1953 |
| 2,711,565 | Levin | June 28, 1955 |
| 2,739,471 | Cook et al. | Mar. 27, 1956 |